No. 656,636. Patented Aug. 28, 1900.
G. GIBBS.
ELECTRIC MOTOR SUSPENSION.
(Application filed May 11, 1900.)
(No Model.)

Witnesses:
Raphael Netter
George H. Stockbridge

Inventor
George Gibbs.
by Charles A. Perry — Atty

UNITED STATES PATENT OFFICE.

GEORGE GIBBS, OF PHILADELPHIA, PENNSYLVANIA.

ELECTRIC-MOTOR SUSPENSION.

SPECIFICATION forming part of Letters Patent No. 656,636, dated August 28, 1900.

Application filed May 11, 1900. Serial No. 16,329. (No model.)

*To all whom it may concern:*

Be it known that I, GEORGE GIBBS, a citizen of the United States, and a resident of Philadelphia, in the county of Philadelphia and State of Pennsylvania, have invented certain new and useful Improvements in Electric-Motor Suspension, of which the following is a specification.

My invention relates to the suspension of electric motors employed for propelling vehicles.

The object of the invention is to provide a convenient and economical form of suspension which is independent of the framework of the truck, does not interfere with the action of the springs supporting the body of the vehicle, relieves the truck from undue strain, and generally so supports the motors that their power is applied to the operation of the vehicle with the least disturbance to the easy-riding qualities thereof and at the same time relieves the track and motors from undue pounding.

Figure 1:
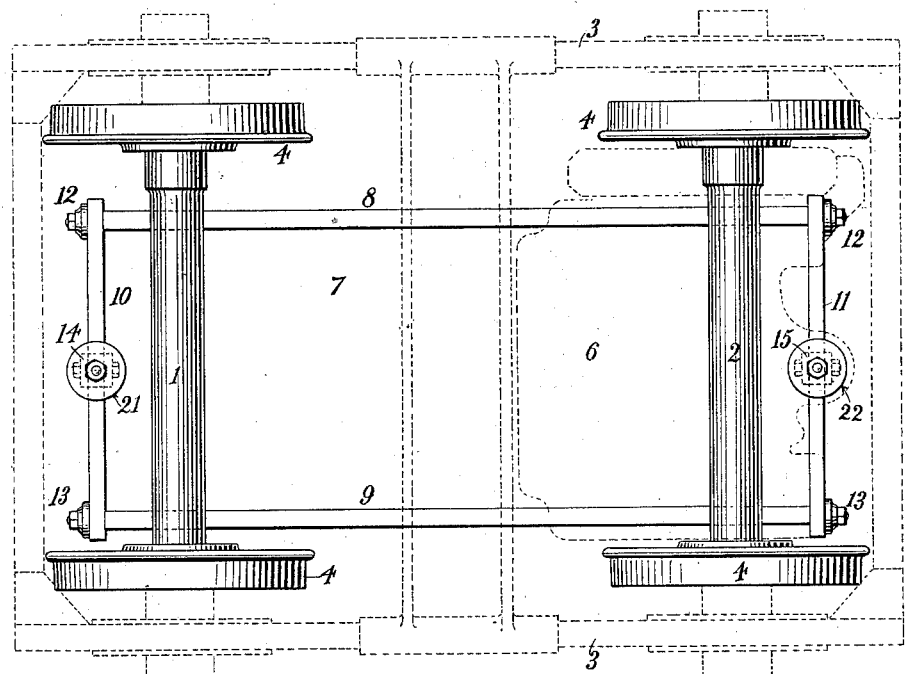
Figure 2:
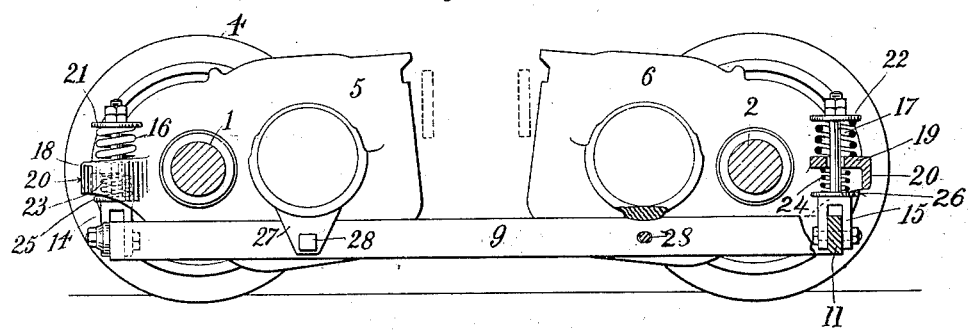

In the accompanying drawings, Figure 1 is a plan of my suspension device with one of the motors removed and the truck-frame and the other motor shown only in dotted lines, and Fig. 2 is a side view of my motor-suspension device with the motors in place.

Referring to the drawings, 1 and 2 represent the two axles of a truck, and 3 represents in dotted lines the outline of the truck-frame. These parts may be of any usual construction. The car-wheels are represented at 4 4. The support for the truck-frame upon the axles may be of any preferred form or arrangement.

The motors are represented at 5 6, the same being supported upon a frame or cradle 7. The present invention relates to this frame and its mode of connection with the motors, whereby the advantages of my motor suspension are secured.

The frame comprises two side bars 8 and 9, which at their respective ends rest upon or are attached to cross-bars 10 and 11. In the drawings the side pieces and cross-bars are represented as being held together by bolts 12 and 13. The cross-bars are themselves here shown as being respectively supported by means of hangers 14 and 15, carried by springs 16 and 17, which rest upon lugs or extensions 18 19 of the motors. The lugs or extensions referred to form in the present instance central horizontal webs within housings 20 20, formed on the rear portions of the motors. The springs 16 17 are compressed between these webs and caps 21 22 on the hangers 14. Other springs 23 24 are held between the lower sides of the webs and collars 25 26 upon the hangers 14.

The motors 5 and 6 may be of any well-known construction and are sleeved upon the truck-axles 1 and 2. It is understood that the motor-armatures will be brought into operative connection with the said axles by means of gear-wheels or in any other suitable way.

The bars 8 and 9 appear in the drawings as passing through slots made in extensions 27 27 below the main body of the motors, being pivoted within the slots by means of pivotal pins 28 28, which pass through the lips of the extensions 27. Instead of this arrangement the bars may be made to pass through sleeves formed in the field-magnet shells or casings of the motor, or clips attached to the field-magnet shells may pass over the side bars and constitute the connection between the same and the motors. By virtue of the construction described the motors can neither rise nor fall for any considerable distance without occasioning a corresponding movement on the part of the side bars.

The field-magnets of the motors 5 and 6 rest upon the side bars 8 and 9, and, as has been stated, the side bars partake of the movements of the motors occasioned by the normal or abnormal operation of the traction system. Now when the car is propelled in one direction there is given to the field-magnet of one of the motors a tendency to press downward beyond the pressure represented by the dead-weight of the motor, while there is a corresponding tendency on the part of the other motor to lift itself and relieve the side bars of its dead weight, and this condition is reversed when the car moves in the opposite direction, causing a reverse movement of the motor-armatures in each case. Since the motors are centered upon their respective car-axles, they may turn slightly about them in response to the tendencies above mentioned; but any further downward movement of either motor is opposed by the spring 16 or 17, as the case may be, while any lifting or raising of either motor is opposed by the spring 23 or 24. This state of facts is brought about by the special arrangement which I have given to the suspension frame or cradle 7, and by the mode of connection which I have adopted between the side frame or cradle and the motors. The mutual interactions of the frame or cradle and the motors which it supports may be more readily understood if we assume that the car is moving in such a direction that the motor 5, for example, is pressed downward beyond its normal pressure and that afterward the motion of the car is reversed and an opposite tendency of the motor 5 supervenes. In the first instance, the increased pressure of the motor 5 upon the side bars 8 and 9 manifests itself by a partial though slight rotation of the entire motor 5 around the car-axle 1. This causes a downward movement of the inner end of the motor, the same being accompanied by a corresponding upward movement of the rear or outer end thereof. There results a compression of the spring 16, due, secondarily, to the fact that the increased downward pressure of the inner end of the motor is resisted at the remote end of the side bars by reason of their connection with the motor 6. If the remote ends of these side bars were rigidly connected to a stationary part of the truck-frame—say, by a closely-fitting pivot—then the downward movement of the near end of the side bars would represent the entire vertical movement thereof and the only relief from shock which the said motor would experience would be through the medium of the spring 16. In fact, however, the remote ends of the side bars are, through the medium of the cross-bars 10 and 11, themselves united by a spring connection with the rear end of the motor 6. Accordingly the motor 5 in its downward movement is suspended at both ends by springs or flexible supports, so that the tendency to shock is still further relieved. If we assume that the motor 6 has remained stationary during the described movement of the motor 5, then the pins 28 28, connecting the side bars with the motor 6, will have served as pivots on which the side bars turn and there will have been a compression of the spring 24, connected with the motor 6. In other words, there will have been a flexion at both ends of the side bars without sensible shock, although the motor 5 may have moved through a relatively-large arc. Under the assumption of a reverse movement of the car, causing the motor 5 to be lifted, it will be seen that the rear end of the motor will at the same time descend, and the compression of the spring 23, connected with the motor 6, will take place. At the same time a relaxing of the spring 24 will occur, while the spring 17 will be compressed. In actual practice the lifting of one motor usually takes place at the same time with the depression of the other; but the mutual actions of the several springs in such a case, with relation to the frame or cradle 7, will explain themselves, and in any case it will be seen that the movements of the motors take place without shock at either end of the cradle. Owing to the distribution of the leverage, the action of each motor in its movements of ascent and descent is greater upon the nearer ends of the side bars than upon the more remote ends. By the construction described the greater portion of the weight of the motors is supported indirectly upon the car-axles and the entire weight is independent of the main truck-frame.

A feature of construction which contributes to the general flexibility of my suspension device is that which consists in attaching the hangers to the cross-bars midway between the ends of said cross-bars. This arrangement tends to equalize the pressures at different points of the suspension system, and also to equalize the wear on the axles at the bearings of the opposite sides of the motors, and so makes the entire structure less liable to undue localization of the pressures, and consequently less liable to shock. Being suspended in the manner described, the cradle is adapted to swing somewhat in case of a greater pressure upon one side thereof than upon the other, whereby the general object of the supporting system is greatly assisted.

The invention claimed is—

1. A balanced cradle for suspending a pair of axle-mounted car-motors, consisting of a quadrilateral frame on which the motor-bodies normally rest, the frame being connected at the middle of two of its opposite sides to the rear or outer ends of the motors through the medium of springs acting in opposite directions.

2. The combination with a pair of car-motors sleeved to the truck-axles, of a balanced cradle flexibly connected to the rear or outer ends of the motors at opposite ends of the cradle and midway of said ends.

3. The combination with a pair of car-motors sleeved to the truck-axles, and respectively having bearings on the axles at or near the sides of the motors, of a balanced cradle flexibly connected to the rear or outer ends of the motors at points equidistant from the bearings.

Signed at New York, in the county of New York and State of New York, this 5th day of May, A. D. 1900.

GEORGE GIBBS.

Witnesses:
WM. H. CAPEL,
GEORGE H. STOCKBRIDGE.